(No Model.) 2 Sheets—Sheet 2.

L. T. WICKS.
DISK HARROW.

No. 555,144. Patented Feb. 25, 1896.

Witnesses
C. F. Blake
A. A. Murray

Inventor
Lars T. Wicks.
By Coburn & Thacher
Attys.

UNITED STATES PATENT OFFICE.

LARS T. WICKS, OF NEWARK, ASSIGNOR OF ONE-HALF TO GEORGE W. GURLEY, OF SANDWICH, ILLINOIS.

DISK HARROW.

SPECIFICATION forming part of Letters Patent No. 555,144, dated February 25, 1896.

Application filed May 7, 1895. Serial No. 548,403. (No model.)

*To all whom it may concern:*

Be it known that I, LARS T. WICKS, a citizen of the United States, residing at Newark, in the county of Kendall and State of Illinois, have invented certain new and useful Improvements in Disk Harrows, which are fully set forth in the following specification, reference being had to the accompanying drawings, in which—

Figure 1:
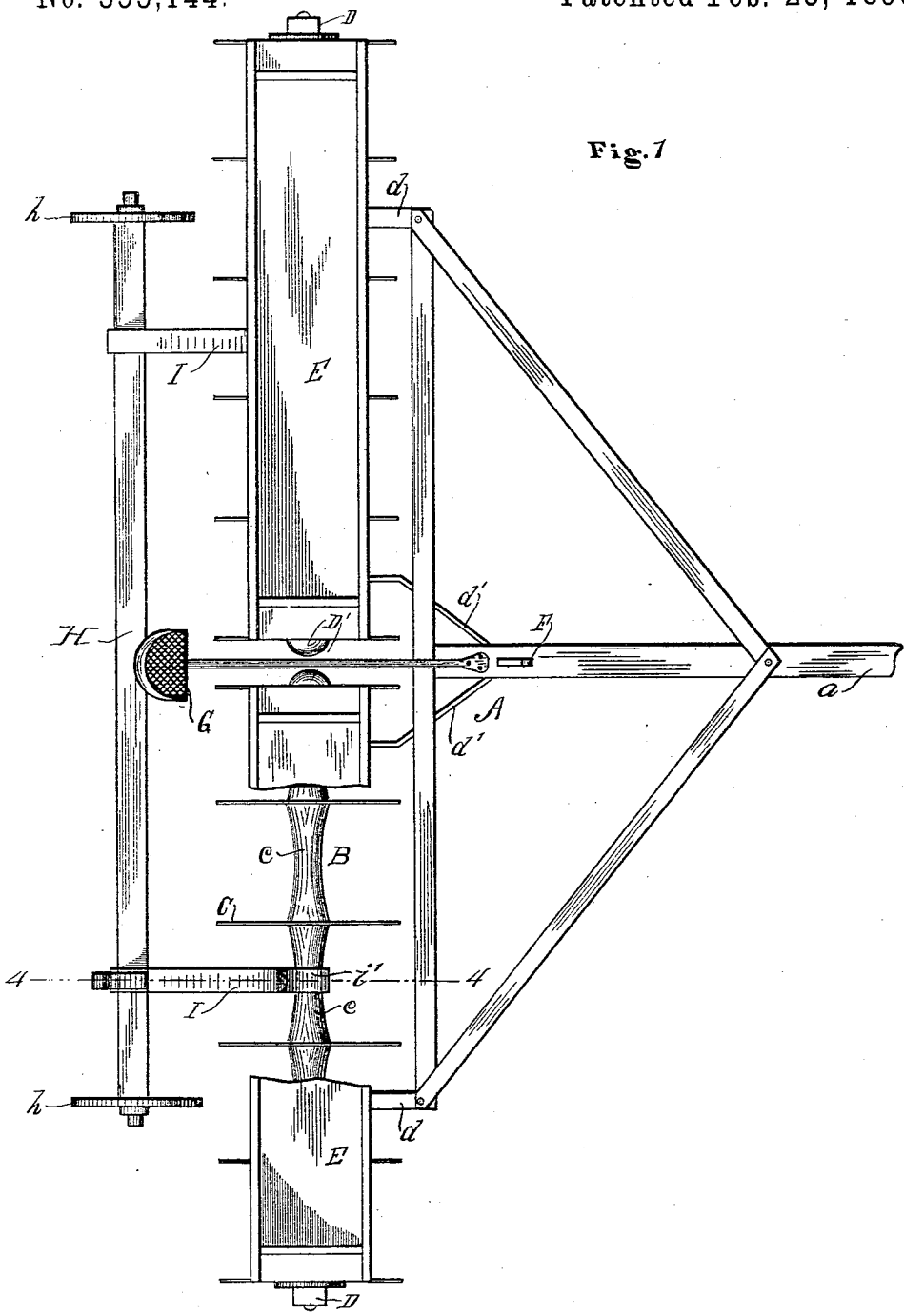
Figure 2:
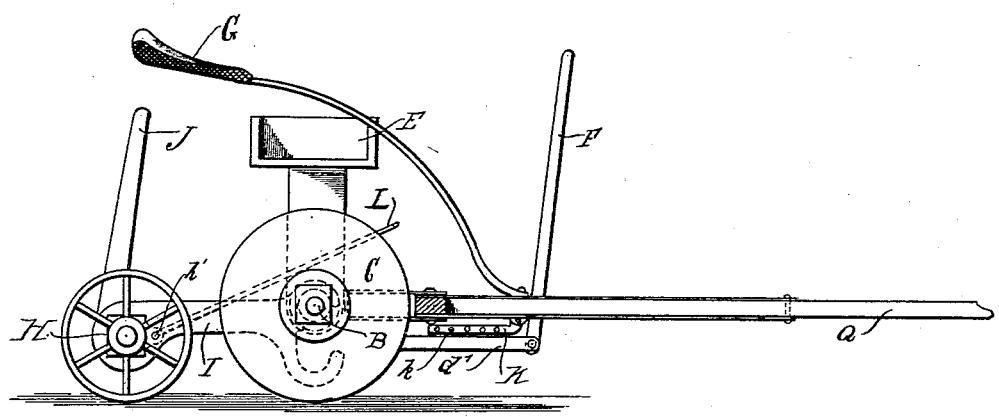
Figure 3:
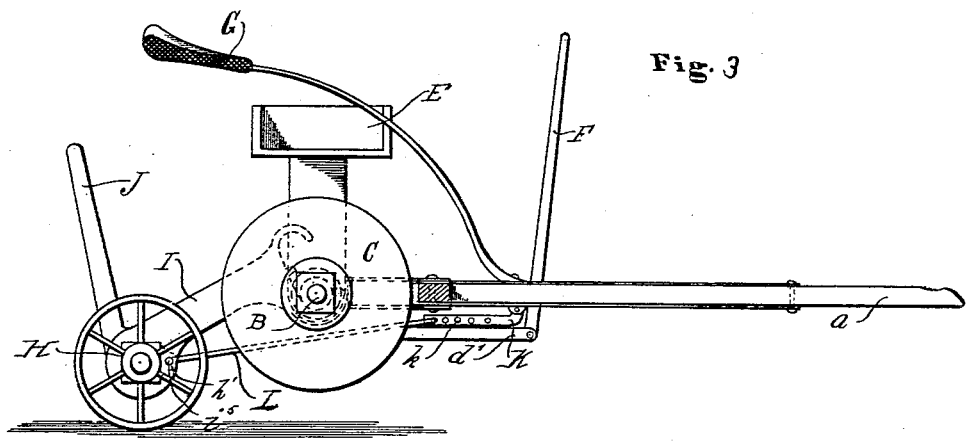

Figure 1 represents a plan view of a complete disk harrow, the pole and top receptacle being partially broken away, with my invention applied thereto; Fig. 2, a side elevation of the same with the harrow-disks in working position; Fig. 3, a similar view with the said disks raised and carried by supplementary wheels and axle for transportation; and Fig. 4, a detail section through one of the axle-supporting arms, taken on the line 4 4 of Fig. 1.

My invention relates to disk harrows, and especially to a device for raising the harrow-disks above the ground and supporting them in this position in transportation from place to place.

The invention consists in a supplementary axle provided with a carrying-wheel at each end and connected with the respective disk shafts or axles by devices whereby the latter can be elevated at will to lift the disks from the ground, and may also be completely disconnected from said disk-axles whenever desired.

A detailed description of the construction and operation of my invention, with reference to the accompanying drawings, will now be given, and the particular improvements which are believed to be new, and which it is desired to secure by Letters Patent, will then be more distinctly pointed out in claims.

In the drawings there is represented a disk harrow of ordinary construction, which therefore need not be described in all specific details in the present case. It consists of a frame A, to which a tongue or pole $a$ is secured, and disk shafts or axles B, on which are fixed ordinary harrow-disks C, and which are journaled in hangers D and D′, depending from the boxes or receptacles E, the outer ones, D, connected to the frame by pivoted or hinged links $d$, while the inner ones, D′, are connected by rods or arms $d'$ to the lower end of a hand-lever F, the said two rods being inclined toward each other as they extend forward and joined at their front ends by a hinged or pivotal connection with the lower end of said lever, which in turn is pivotally mounted in the pole. The disks are fixed on their shafts in any usual way and are separated or spaced by collars $c$, also mounted and fixed on the said shafts. A seat G for the driver is mounted in the usual way upon the frame. All of these parts named above are of any ordinary or usual construction and need no special description in the present case, except the disk shafts or axles. These shafts are provided with a series of thimbles $c$, which are arranged between the disks, thereby spacing the latter and at the same time revolving with them.

Figure 4:
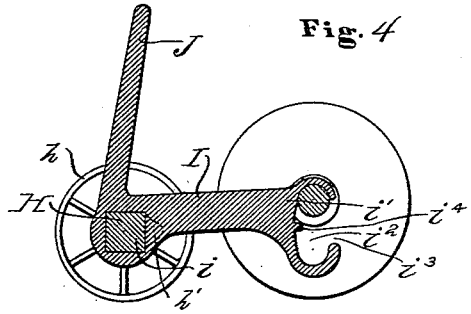

The main feature of my invention is a device by means of which the disk-axles and disks may be raised sufficiently to lift the disks above and free from the ground. This improvement consists in a supplemental axle H, somewhat shorter than the two disk-axles combined and of angular form, preferably rectangular, as indicated in the drawings. This axle or axle-bar may be of wood, but preferably is made of iron or other suitable metal. At each end there is a skein or other suitable journal device, on each of which is mounted or journaled a small wheel $h$, making a carrier for the axle. Two arms I are slightly enlarged at one end and provided with apertures $i$ of angular form corresponding to the contour of the axle, so that they can be slipped thereon and secured in any suitable way to the axle without bolts or other like devices. These arms project forward from the supplemental axle and at their outer ends are enlarged vertically to provide a kind of head $i'$. Preferably this enlargement $i'$ is mainly below the body of the arm, and the whole piece is cut out centrally to provide an oblong opening $i^2$ concave at each end and having an opening outward from the central portion by a cut $i^3$ in the outer rim or inclosing strip. At the inside there is a short lug or stud $i^4$, projecting outward toward the opening $i^3$, just mentioned above. A handle J is provided whereby the said angular axle may be turned. This handle is secured in a fixed position either to the axle itself or to one of the arms, or preferably it may be cast in one piece with one of said arms, which latter construction is clearly shown in Fig. 4. The supplemental axle is connected to the respective disk shafts or axles by means of the apertures and front openings into the same in the forward ends of the arms. This is accomplished by arranging the armed axle in rear of the harrow and setting it up toward the latter with the arms substantially horizontal, when the respective disk shafts or axles will be received into these openings in the front ends of the arms. The front side opening $i^3$ permits this end of the arms to be set in above and below the disk-axles, and for working position the arms are then allowed to drop upon the disk-axles, which pass up into the upper concavity in the outer ends of the arms, as seen in Fig. 4, in which position the harrow-disks are in working adjustment and the supplementary shaft and wheels are simply drawn along behind the harrow. About midway of this supplemental shaft there is a short projection or bracket $h'$ on the front side of the axle. There is also a kind of link-arm K bent upward slightly at its front end and hinged or pivoted at this end to a suitable supporting device on the under side of the pole, or any other part of the frame adapted to the purpose for which this device is intended. From the pivotal connection it extends backward, the rear end being free, and this straight portion is perforated with a series of apertures $k$.

A link-rod L is provided with a kind of bend or hook at each end, one of which is adapted to be hooked into an aperture $i^5$ in the stud $i^4$, while the other is adapted to be hooked into one of the apertures in the link-arm K. Now, while the harrow is under working adjustment this jointed connection between the supplemental axle and main frame or other suitable support is disconnected, as indicated in Fig. 2, when this supplemental device has no operative effect, but simply trails along in rear of the harrow. When, however, it is desired to adjust the harrow for transportation from place to place, this link-rod is connected up, as described above and as indicated in Fig. 3, and this connecting device is intended to be so short that with the assistance of the lever the supplemental axle will be turned backward sufficiently to throw the arms upward until the bottoms of the front openings therein come up against the disk-axles and then lift or raise the latter until the disks are entirely free from the ground, as indicated in Fig. 3. When the disk shafts or axles are lifted sufficiently high to clear the disks entirely from the earth the link-rod is connected to the perforated pivoted arm in that one of the apertures therein which it meets, and with this adjustment the harrow-disks will be held permanently in the said elevated position, as seen in Fig. 3, and the implement can be transported readily from place to place without any wear whatever on the disks.

The little lug in the short opening of the arms serves to some extent as a stop to the disk-axles when either in the upper concavity or in the lower one, as indicated by full lines in Fig. 4 and dotted lines in Fig. 3. Whenever the implement reaches a place for work, the harrow-disks are lowered again to the ground by disconnecting the connecting-rod, as described above, when the disks drop on the ground again and the supplemental lifter simply trails behind, or, if desired, may be entirely detached from the harrow until again required for moving the latter to some other location.

With this structure I obtain a simple, cheap, but at the same time very effective means for lifting the harrow-disks clear from the ground and maintaining them in this position during transportation from one place to another without performing work.

Some changes may be made in some of the particular mechanical devices which are herein shown and described without losing or dispensing with the main features of the improvement, and such changes are contemplated in the application of the device to harrows differing in construction, and are considered as within my invention.

Having thus described my invention, what I claim to be new, and desire to secure by Letters Patent, is—

1. In disk harrows, the disk-shafts, in combination with a supplemental axle of angular form in cross-section and provided with carrying-wheels, arms, I, constructed at one end with angular apertures, $i$, corresponding to the angular axle, whereby they may be applied to and fixed on said axle without bolts or other like devices, having an enlarged opening at their front ends adapted to receive and engage the disk-shafts, and a detachable and adjustable connecting device between the supplemental axle and the harrow-supporting frame, substantially as described.

2. In disk harrows, the disk-shafts, in combination with a supplemental axle, H, provided with carrying-wheels, $h$, arms, I, mounted at one end on said axle and at their outer or free ends provided with an enlargement or head, $i'$, having an oblong, vertical opening or slot, $i^2$, and a side opening, $i^3$, about midway of the front arm inclosing said slot, and an adjustable and detachable connecting device between said supplemental axle and the main frame of the harrow, substantially as described.

3. In disk harrows, the disk-shafts, in combination with a supplemental axle and wheels, arms, I, secured at one end to said axle and at their free ends enlarged vertically to form a kind of head, $i'$, which is constructed with an oblong slot or opening, $i^2$, running vertically and concave at each end, and a front cut or opening, $i^3$, leading into this slot, link-rod, L, hinged or pivoted at one end to the supplemental axle, and link-arm, K, hinged or pivoted at one end to a support on the main frame and provided with a series of apertures, $k$, with either of which the front end of the connecting-rod may be engaged, substantially as described.

4. In disk harrows, the disk-shafts, in combination with the supplemental axle, H, and carrying-wheels, $h$, arms, I, mounted at one end on said supplemental axle and at their forward, free, ends constructed with a vertical enlargement, $i'$, having a vertical, oblong opening, $i^2$, concave at both upper and lower ends, and a front passage, $i^3$, into said opening, with a short stud, $i^4$, projecting outward slightly about midway of the back, and a link-rod, L, hinged or pivoted at one end to the supplemental axle and adjustably and detachably connected at its other end to the main frame, substantially as described.

LARS T. WICKS.

Witnesses:
S. B. STINSON,
C. A. PHELPS.